MOLD FOR MOUNTING SWITCH BLADES AND THE LIKE

Filed Feb. 16, 1967 4 Sheets-Sheet 1

INVENTORS
EDGAR P. CANTY
THEDORE J. OBSZARNY
BY Bair, Freeman & Molinare
ATTORNEYS Sept. 23, 1969 E. P. CANTY ET AL 3,467,986

MOLD FOR MOUNTING SWITCH BLADES AND THE LIKE

Filed Feb. 16, 1967 4 Sheets-Sheet 2

INVENTORS
EDGAR P. CANTY
THEDORE J. OBSZARNY
BY Bair, Freeman & Molinare
ATTORNEYS

MOLD FOR MOUNTING SWITCH BLADES AND THE LIKE

Filed Feb. 16, 1967 4 Sheets-Sheet 3

INVENTORS
EDGAR P. CANTY
THEDORE J. OBSZARNY
BY Bair, Freeman & Molinare
ATTORNEYS

MOLD FOR MOUNTING SWITCH BLADES AND THE LIKE

Filed Feb. 16, 1967 4 Sheets-Sheet 4

INVENTORS
EDGAR P. CANTY
THEDORE J. OBSZARNY
BY Bair, Freeman & Molinare
ATTORNEYS

United States Patent Office 3,467,986
Patented Sept. 23, 1969

3,467,986
MOLD FOR MOUNTING SWITCH BLADES AND THE LIKE

Edgar P. Canty, Elmhurst, and Thedore J. Obszarny, Chicago, Ill., assignors to Guardian Electric Manufacturing Co., Chicago, Ill., a corporation of Illinois Continuation-in-part of application Ser. No. 439,534, Mar. 15, 1965. This application Feb. 16, 1967, Ser. No. 628,197
Int. Cl. B29d 3/00
U.S. Cl. 18—36 20 Claims

ABSTRACT OF THE DISCLOSURE

A special mold for mounting relay switch blades and the like, provided with pivoted fingers to support the switch blades in proper position for the mounting to be molded around specific portions of the blades including liners for certain openings through the switch blades, and after the mold is opened the fingers are operable to elevate the assembly of switch blades and mounting to a position for extraction from the mold. Means are provided for accurately positioning the switch blades with respect to the mold and core pins thereof which extend through the openings of the switch blades to form the liners.

This invention relates to a mold for molded type switch blade mountings and similar electrical components, the present application being a continuation-in-part of our co-pending application Ser. No. 439,534 filed Mar. 15, 1965, now abandoned.

One object of the invention is to provide a mold having means to accurately position contact blades of a switch or electric terminals and the like with respect to a mold cavity.

Another object is to provide the positioning means in the form of pivoted fingers, two of which are beyond the outer surfaces of a plurality of contact blades or the like while one or more other fingers serve as spacers between the contact blades.

Still another object is to provide these fingers with certain notches to receive the contact blades in accurately positioned relationship to the mold cavity.

A further object is to provide the fingers in sets which may be readily removed from and replaced in the main body of a single mold for accommodating different combinations of contact blades or the like, different numbers thereof, and different shapes and/or sizes thereof.

Still a further object is to produce the fingers so designed that they carry the molded assembly consisting of such contact blades or the like and the body of molded material in which they are imbedded out of the mold and break up any flashes formed in the mold cavity so that these flashes may be conveniently cleared from the mold by a shot of compressed air, thus keeping the mold clean at all times by the expedient of supplying such shot of compressed air for every molded assembly removed from the mold cavity.

An additional object is to provide means for pivoting the fingers to an open position wherein some of the fingers carry the molded assembly with them to a position of access for ready removal from the mold.

Another additional object is to provide a mold which has core pins to form mounting holes in a molded switch or the like, and which are movable into and out of the mold cavity, a precision fit of the pins in a fixed sidewall of the mold being provided so as to preclude the formation of flashes which would interfere with free movement of the core pins relative to the mold.

Still another additional object is to provide certain fingers of the mold with recesses for receiving tabs projecting from the edges of the switch blades so as to accurately position the switch blades longitudinally within the mold and to thereby provide precision centering of the core pins with respect to mounting holes in the switch blades, and thereby equal wall thickness of the liners.

A further additional object is to provide the mold cavity of such shape as to provide round corners for the switch blade mounting molded around the switch blades to facilitate pivoting of the fingers at the time of removing the switch blade assembly from the mold.

Still a further object is to provide a modified form of mold which eliminates ejection means for the switch assembly with respect to the mold, and eliminates the necessity of providing automatic means for actuating such ejection means.

Still a further additional object is to provide a mold so designed that the portion thereof forming the molded mounting for switch blades, while being hot enough to effect a proper molding cycle, does not heat the switch blades to such an extent that the contacts thereon will become oxidized and discolored, and any appurtenances of nylon or the like carried by the outer ends of the switch blades will not be detrimentally affected by the temperature of the mold surrounding the molded mounting and the temperature of the molded material itself which must be rather high to be satisfactorily molded.

With these and other objects in view, our invention consists in the construction, arrangement and combination of the various parts of our mold for mounting switch blades and the like whereby the objects above contemplated are attained, as hereinafter more fully set forth, pointed out in our claims and illustrated in detail on the accompanying drawings, wherein:

Figure 6:
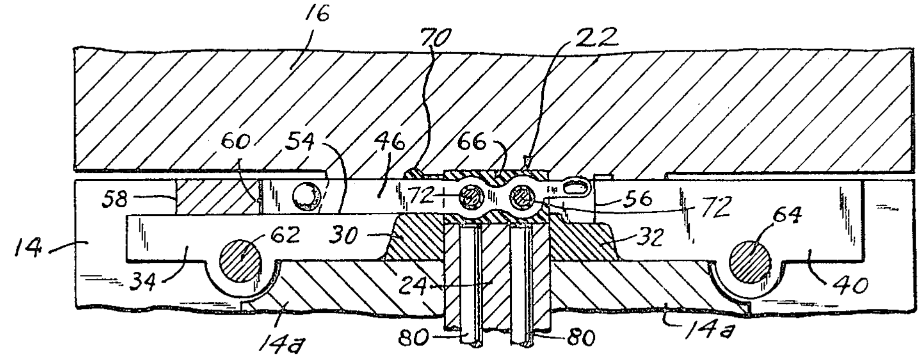
FIG. 6 is a similar sectional view showing the mold cover in position and the molded material forming a mounting for the contact blades filling the mold cavity.
Figure 7:
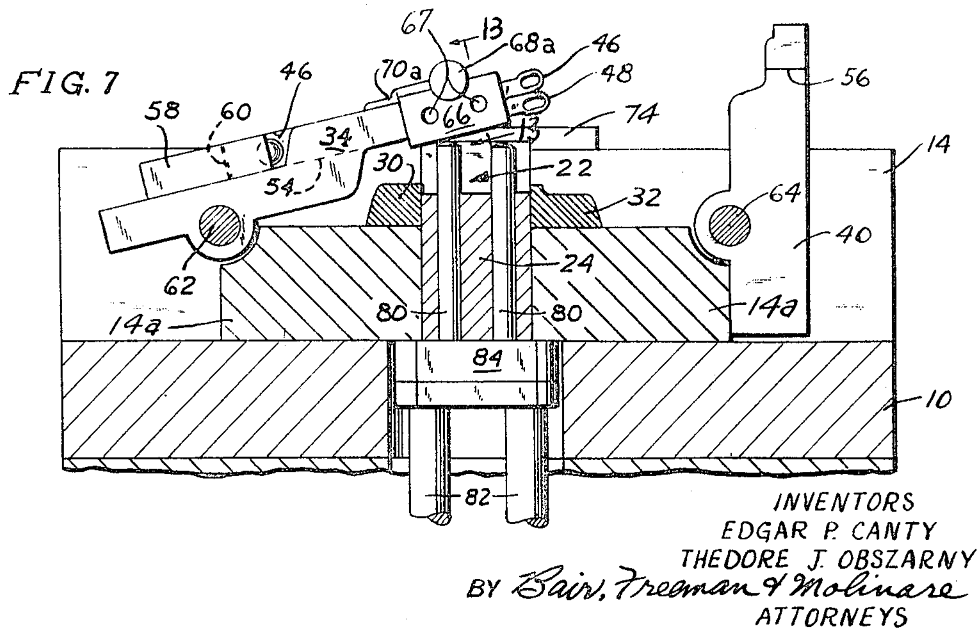
FIG. 7 is a similar sectional view showing the mold cover removed following curing of the molded material and showing the completed switch including its mounting being ejected from the mold.
Figures 14, 15, 16, 17, 18:
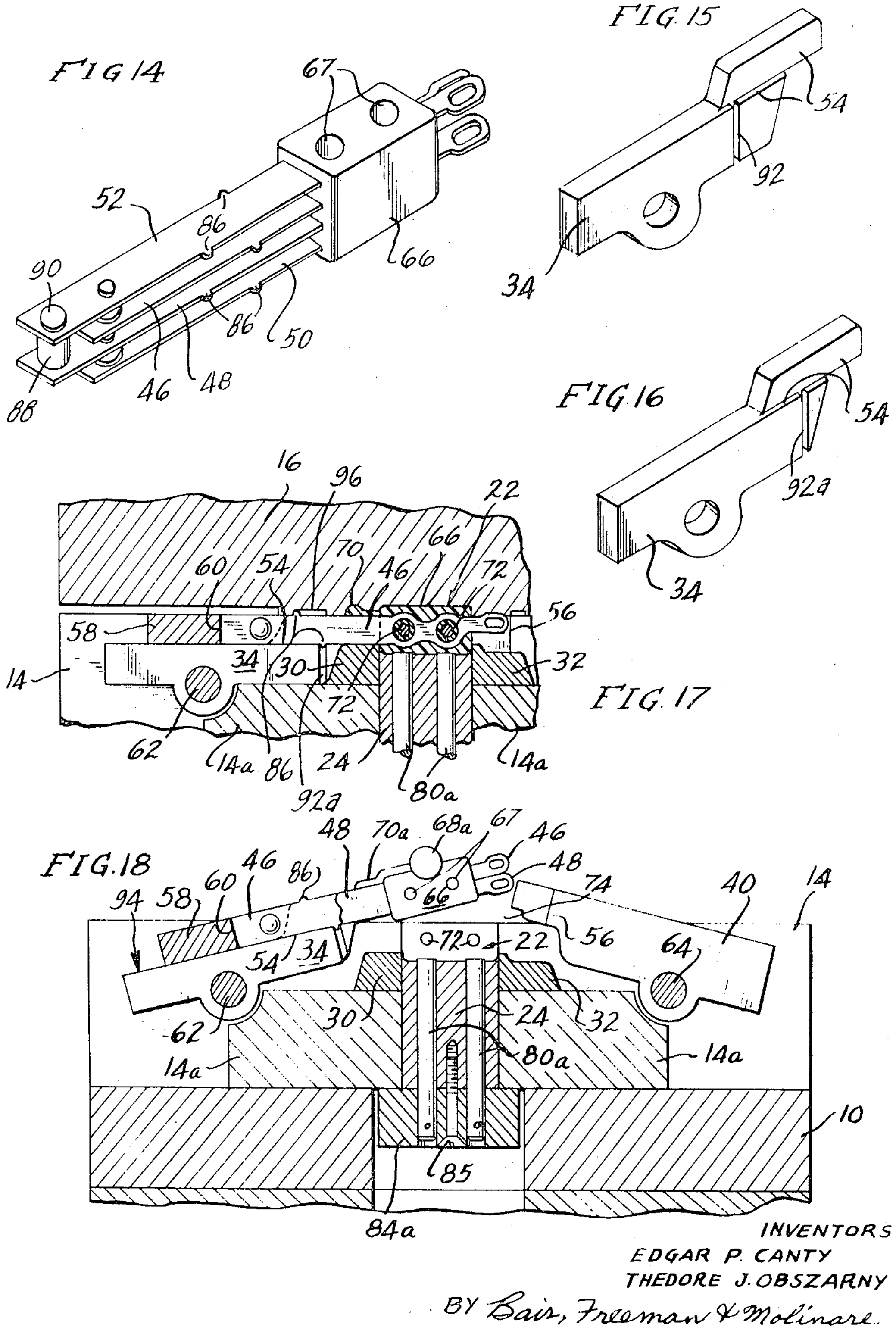
FIG. 14 is a perspective view similar to FIG. 11 showing a modified form of switch assembly including locating tabs on the switch blades.
FIG. 15 is a perspective view similar to FIG. 2 showing a modified form of pivoted finger including a locating groove in one position for a purpose which will hereinafter appear.
FIG. 16 is a similar perspective view showing the same finger with a locating groove in a different position.

FIG. 17 is a sectional view similar to a position of FIG. 6 but showing the modifications in the mold required to accommodate the switch assembly of FIG. 14 and the fingers of FIGS. 15 and 16, the mold being shown in a closed position and the molded material forming a mounting for the contact blades filling the molded cavity; and FIG. 18 is a sectional view similar to FIG. 7 also showing these modifications, showing the mold cover removed following curing of the molded material and showing the completed switch including its mounting being ejected from the mold.

On the accompanying drawings our mold is built up of rectangular blocks of steel or the like wherein a base block 10, a front block 12 and a back block 14 form a channel in which a cavity-forming member 24 (see FIG. 8) is mounted, the cavity-forming member having a cavity front member 26 and a cavity back member 28. The mold cavity is shown at 22 between the cavity members 26 and 28, the bottom thereof being formed by the member 24. The top of this cavity is formed by a mold cover 16.

Figures 8, 9, 10, 11, 13:
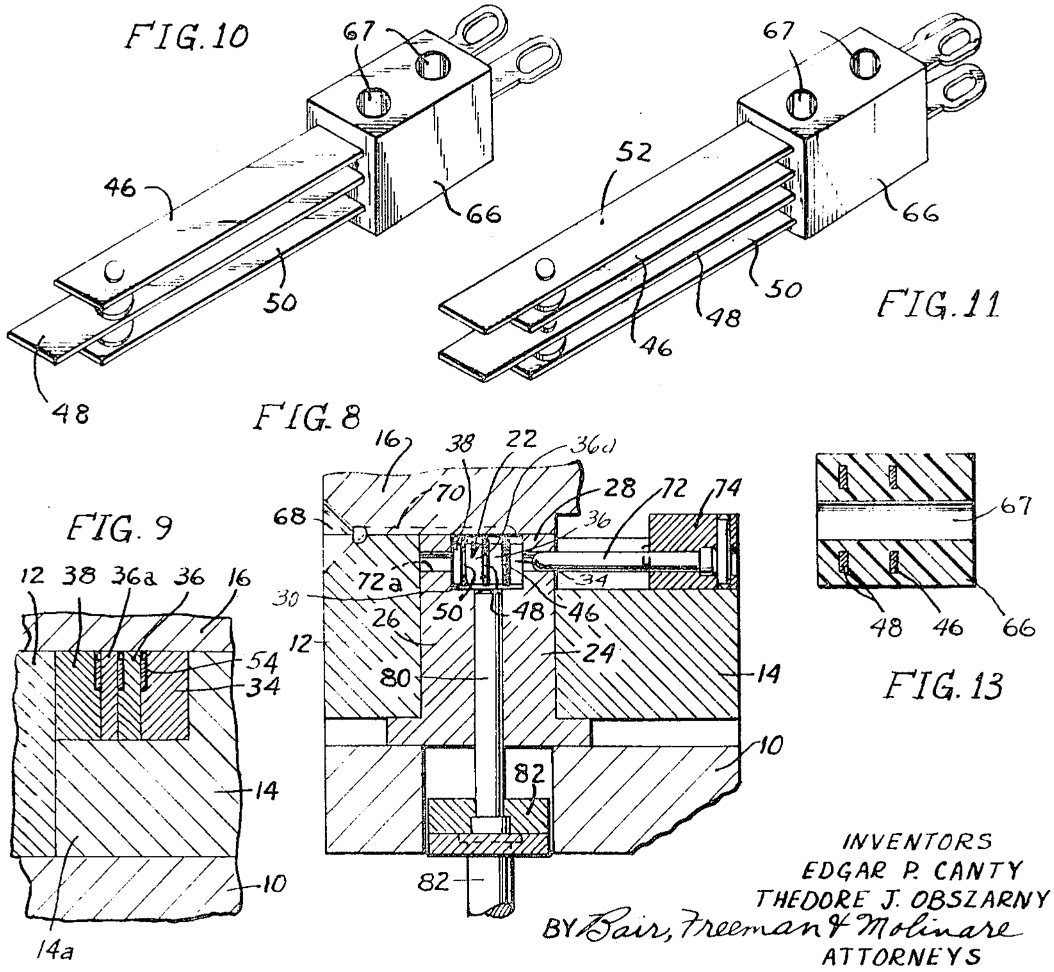
FIG. 8 is a vertical sectional view on the line 8—8 of FIG. 1, as taken through the mold cavity and showing four pivoted fingers and three contact blades instead of two blades as in the previous figures.
FIG. 9 is a vertical sectional view on the line 9—9 of FIG. 1, as also taken through a mold having four pivoted fingers.
FIG. 10 is a perspective view of a three-blade switch and a completed mounting therefor.
FIG. 11 is a similar perspective view showing a four-blade switch.
FIG. 13 is an enlarged sectional view through the finished switch as taken on the line 13—13 of FIG. 7.

The mold cavity 22 is adapted for the molding therein of a molded block or mounting 66 shown in FIGS. 10 and 11 in which various combinations of contact blades 46, 48, 50 and 52 may be molded as illustrated. Alternatively, other elements may be imbedded in the molded block 66 such as electric terminals or the like. The molded mounting 66 is provided with mounting holes 67 which are also molded therein. The mounting 66 is provided in lieu of the usual contact blades "stack" of the prior art wherein insulation spacers are provided between the contact blades and on the outer surfaces of the outer blades, and a pair of tubes of insulating material extend through the mounting holes of the contact blades and through corresponding openings of the spacers, the entire switch structure being thus a loosely assembled mounting requiring the use of mounting screws to lock the parts in final and permanently assembled relationship. Even then the contact blades may be out of alignment, and accordingly the contacts carried by them likewise out of alignment, and the distance between contacts may vary considerably requiring final adjustments after the assembly is locked together by the mounting screws. Subsequently, if the screws are loosened, the parts may again become misaligned to the detriment of the operation of the switch.

On the other hand, we provide the contact blades accurately positioned with respect to the mold cavity 22 of our mold, and then provide a molded mounting 66 which is precise in dimensions and holds all the contact blades in absolute alignment during the molding process and thereafter while the switch is being installed and subsequently used. The contact blades are precisely spaced and their contacts accordingly precisely spaced with respect to each other when the completed switch is removed from the mold. Thereupon, certain of the contact blades may be jig-bent to constitute "normally closed" contacts and to provide the contacts with the desired contact pressure when in closed condition.

Figure 1:
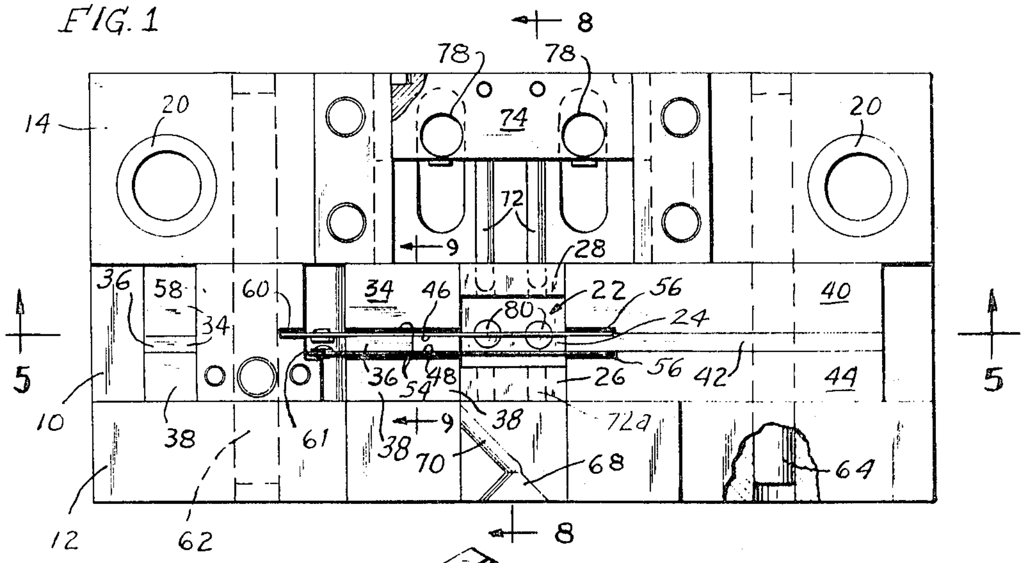
FIG. 1 is a plan view of a mold embodying our invention, one specifically designed for switch blades being illustrated, the mold cover being removed and the parts being in reception position and a pair of contact blades being shown deposited therein.

In a mold of the character herein disclosed, it is desirable to provide a versatile arrangement for permitting different numbers and combinations of contact blades such as two, three or four blades as shown in FIGS. 1, 10 and 11, respectively, yet maintain a predetermined size of molded mounting block 66. Also, it is desirable to provide means in the mold for receiving the contact blades in accurate positions with respect to the mold cavity and to provide a means for ejecting the completed switch from the mold after the molding and curing operations. The objectives are accomplished by a series of fingers mounted in the channel 10, 12, 14 to the left and right of the cavity 22 as shown in FIGS. 1, 4, 4A and 9. These fingers are shown at 34, 36 and 38 to the left of the mold cavity in FIG. 1 and at 40, 42 and 44 to the right of the mold cavity for a two-blade switch.

The fingers 34, 36 and 38 are pivoted on removable pivot pins 62 and the fingers 40, 42 and 44 are pivoted on removable pivot pins 64. Referring to FIGS. 6 and 7, finger supporting blocks 30 and 32 are provided for the fingers in their mold-closed position.

Figure 2:
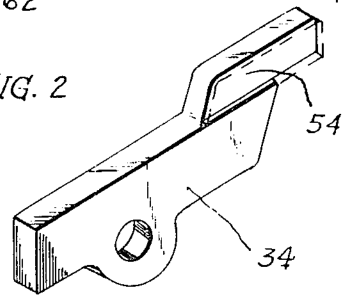
FIGS. 2 and 3 are perspective views of two pivoted fingers used in our mold.
Figure 3:
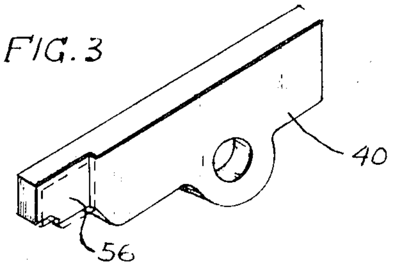

Referring to FIGS. 2 and 3, the fingers 34 and 40 are shown and it will be noted they are provided with notches 54 and 56 respectively (cut back from the near-side faces of the fingers as indicated by dash lines) which accommodate the contact blade 46. These notches are also indicated in FIG. 1. Without going into further detail, the fingers 38 and 44 are provided with similar notches which accommodate the contact blade 48. Thus, the main portions of the contact blades 46 and 48 are positioned by the notches 54 with respect to the cavity front member 26 and the cavity back member 28, and are positioned at their right-hand ends (terminal ends) by the notches 56. The finger 38 is provided with a stop block 58 which has a notch 60 to serve as a stop for the left-hand end of the contact blade 46 and a shoulder 61 to serve as a stop for the left-hand end of the contact blade 48. Accordingly, the contact blades are confined in all four horizontal directions, and in the vertical direction by the bottoms of the notches 54 and 56. Their upper edges are spaced from the bottom surface of the central portion of the mold cover 16 over the mold cavity 22 as shown in FIG. 6. Accordingly, when insulating material is molded in the cavity 22 around the switch blades, it covers their edges against external electrical contact, thus giving electrical protection for these edges as shown in FIG. 13 which are exposed in the prior art "stack" type switch and therefore capable of becoming shorted.

Figure 4:
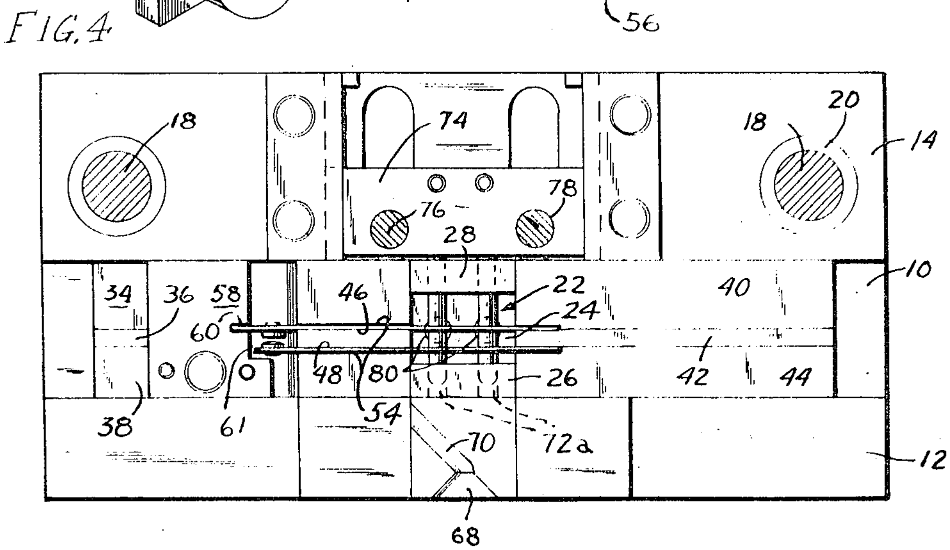
FIG. 4 is a plan view similar to FIG. 1 showing mounting hole pins of FIG. 1 in a different position.
Figure 4A:
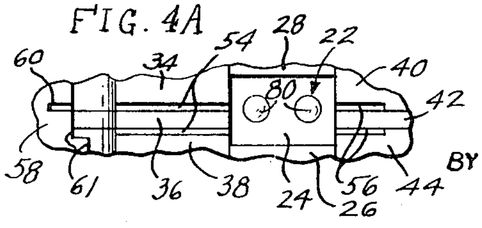
FIG. 4A is a plan view similar to a portion of FIG. 1 to show certain notches in pivoted fingers of our mold before contact blades are deposited therein.

Provision must also be made for forming the mounting holes 67 to receive mounting screws when the switch is subsequently installed, and this we accomplish by means of mounting hole pins 72 mounted on a carrier block 74 which may be slid from the position of FIG. 1 to the position of FIGS. 4 and 6. In the position of FIG. 1, the mounting hole pins 72 are retracted from the mold cavity whereas in FIG. 4 they are projected through it as to the dotted position shown. The mounting hole pins 72 are smaller than the holes in the contact blades through which they extend so that the molding material forms a tubular liner for these holes as shown in FIGS. 6 and 13, thus insulating any mounting screws that are subsequently used in the holes 67 from electrical contact with the contact blades themselves.

At the parting line of the mold between the lower portion thereof shown in FIG. 1 and the mold cover 16 shown in FIGS. 6 and 8, a sprue 68 is provided communicating with a gate 70 leading to the mold cavity 22. Accordingly, after the mold has been closed an extrusion nozzle may be associated with the sprue 68 and hot flowable molding material having the requisite insulating qualities is injected through the gate 70 and into the mold cavity 22 to form the molded mounting 66 shown in FIG. 6 after the material has cooled and set.

The back block 14 is provided with a pair of bushings 20 to receive guide pins 18 which extend downwardly from the mold cover 16 and serve to accurately position the cover with respect to the mold parts 10, 12, 14. The carrier block 74 is provided with holding pin holes 78 to receive holding pins 76 that also extend downwardly from the mold cover 16 when the parts are in the position shown in FIG. 4.

Figure 5:
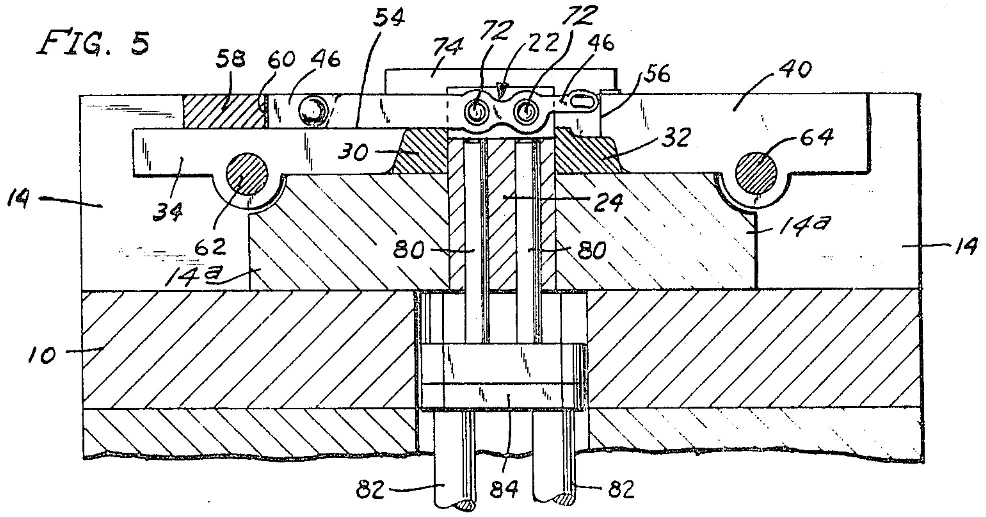
FIG. 5 is a vertical sectional view on the line 5—5 of FIG. 1 prior to placement of the mold cover in position.

Our mold is provided with ejection pins 80 actuated by ejection rods 82, the two being connected together by a head 84 as shown in FIGS. 5, 7 and 8. In FIG. 9 where four fingers are shown instead of three as in FIG. 1, the fourth finger is identified **36*a* as it is substantially a duplicate of the finger 36. Similarly in FIG. 12 where five fingers are shown, the fifth one is identified 36*b* while at the right side of FIG. 12 there are three corresponding fingers 42*a*, 42*b* and 42*c*. With five fingers at each end of the mold cavity 22, the mold is, of course, set up for producing the end product shown in FIG. 11 whereas when set up as in FIGS. 8 and 9, the end product is as shown in FIG. 10. FIG. 9 also illustrates how the back block 14 has an extension 14*a* under the fingers to support them in conjunction with the finger-supporting blocks 30 and 32** as shown also in FIGS. 5, 6 and 7.

In the modified form of the switch assembly shown in FIG. 14 the switch blades are provided with positioning tabs 86, either one or two as desired, projecting from the side edges thereof. The switch assembly disclosed also shows a lifter button or post 88 which may be formed of fiber, nylon or the like, and either riveted as at 90 to one of the switch blades or molded in position with respect to an opening through the switch blade.

FIGS. 15 and 16 show the finger 34 provided with grooves 92 and **92*a* respectively, the difference between the two figures being the position of the groove to accommodate either the tab 86 farthest from the molded mounting 66 in FIG. 14 or the one closest to it respectively. The fingers 36 and 38 and any other fingers required for additional switch blades would be appropriately provided with either the groove 92 or the groove 92*a*** depending upon the switch blades to be associated therewith.

As shown in FIG. 17 the tab 86 of the switch blade 46 coacts with the groove **92*a*, entering slightly the top thereof and accordingly accurately positioning the switch blade lengthwise so that the mounting holes in the switch blade are accurately centered with respect to the mounting hole or core pins 72. If not accurately centered, the wall thickness of the insulation lining for the mounting holes of the switch blades would be unequal due to eccentricity. A certain wall thickness is required for electrical insulating purposes with specified voltages and can be maintained if the mounting hole pins 72** are accurately centered but cannot be obtained otherwise. In the latter case it would be necessary to require additional wall thickness to be sure that the thinnest part of the wall is still of the required thickness, thus requiring larger mounting holes in the switch blades and additional molded material thickness for the linings. It is therefore obvious that accurate centering is very desirable.

In comparing the switch assembly of FIG. 14 with that shown in FIG. 11 is will be noted that the vertical corners of the molded mounting 66 in FIG. 14 are rounded. This is also evident in FIGS. 17 and 18. Since the center of the pivot 62 is below the bottom of the mold cavity 22, there was a tendency for the lower left corner of the mounting 66 when moved from the position of FIG. 6 to the position of FIG. 7 to catch on the finger supporting block 30. By rounding the mounting corners this is eliminated and the completed switch assembly can thereby be more readily removed from the mold as by the operator pressing down as indicated by the arrow 94 in FIG. 18 with his finger, thus eliminating the necessity of the ejection pins 80 of FIG. 7.

We still provide pins **80*a* however merely for the purpose of embossing certain impressions in the mounting 66 such as a switch number on one and a trademark on the other. The pins 80*a* are stationary however instead of slidable as illustrated in FIGS. 6 and 7, and this is accomplished by securing them to a mounting block 84*a* removably as by a screw 85. Removability is desired so that other embossing pins 80*a*** may be substituted when changing the molds for a run of different style switch assemblies.

PRACTICAL OPERATION

In the operation of our mold, the mold may be carried by an indexable table or the like on which a plurality of the molds are mounted. At one station, an operator places the contact blades 46 and 48 in the notches 54, 56 and 60 and in association with the shoulder 61 as previously described, thereby accurately locating and aligning the contact blades with respect to the mold cavity 22. The carrier 74 is then moved from the position of FIG. 1 to the position of FIG. 4 for projecting the mounting hole pins 72 through the mold cavity and through the openings of the switch blades, as evident by an examination of FIGS. 5 and 6 in conjunction with FIGS. 1 and 4, after which the mold cover 16 is brought down into position on the top of the mold as in FIGS. 6 and 8. Thereupon, the insulation material may be injected into the mold cavity to form the molded mounting 66.

After the proper curing period, the closed mold may arrive at another station of the indexable table where a second operator causes the fingers 40, 42 and 44 to be swung upwardly on their pivot pin 64 as shown by the finger 40 in FIG. 7, and the ejection pins 80 to be elevated for swinging the fingers 34, 36 and 38 upwardly as also shown by the finger 34 in FIG. 7, carrying with them the completed switch comprising the contact blades and the mounting block 66. This operation breaks up any flashes that may have been formed on the mounting 66 and raises with the contact blades the molded material **70*a* and 68*a* formed in the gate 70 and the sprue 68, respectively, which may thereafter be broken off the switch unit and the unit moved on to a station for further finishing operations. Any of the molding material such as broken-up particles of flashes remaining in the mold may now be readily blown out with compressed air thereby completely cleaning all the mold surfaces so they are ready for the introduction of further contact blades by the first operator above mentioned and for subsequent molding of additional switch assemblies by fitting the mounting hole pins 72 snugly in their slide openings of the cavity front and back members 26 and 28** flashes which would cause binding and impair movement of the pins are precluded and accordingly the operation of the pins is accomplished smoothly and in minimum time.

From the foregoing specification it will be obvious that the pivoted fingers serve to break any flashes in the mold loose and eliminate knock-out pins for the switch assembly, the switch being carried by the fingers at the left in FIG. 7 to the elevated position shown upon actuation of the ejection pins 80. The switch assembly is then in position to be manually removed from the fingers that carry them. By the use of the fingers and the breaking of the flashes thereby, the mold can be completely cleaned in a few seconds with a shot of compressed air after every switch molding operation.

Figure 12:
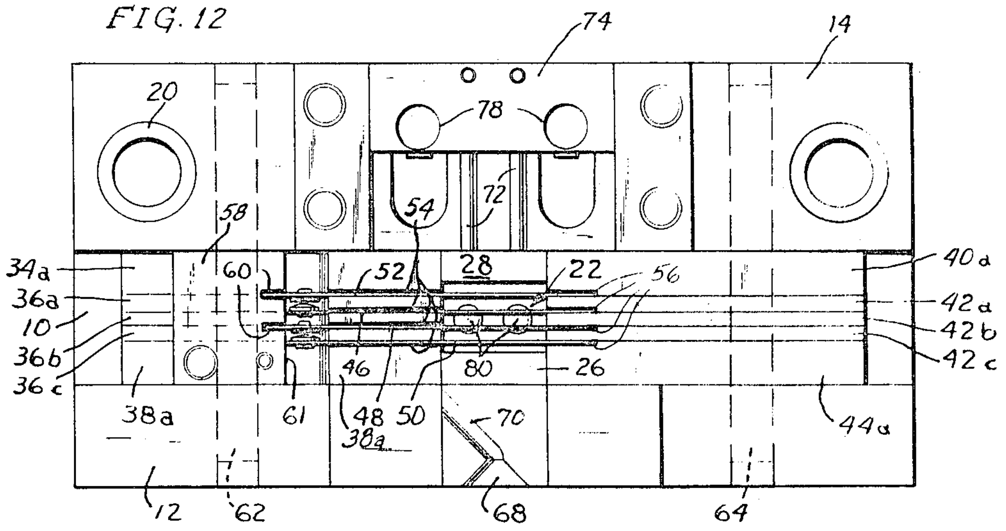
FIG. 12 is a plan view similar to FIG. 1 showing the mold adjusted for a four-blade switch instead of a two-blade switch.

The use of the fingers and removable pins 62 and 64 also provide the possibility of quick interchangeable molds by merely removing one set of fingers and inserting another such as the fingers **34*a*, 36*a*, 36*b*, 36*c*, 38*a*, 40*a*, 42*a*, 42*b*, 42*c* and 44*a* as shown in FIG. 12 so that four contact blades 46, 48, 50 and 52 may be accommodated for the same size of molding cavity 22, and accordingly the same size of molded mounting 66. Some of the fingers serve as spacers and may be of various thicknesses to change the spacing between contact blades, and the end fingers such as 34 and 38** may also be of various thicknesses to change the spacing between the outer blades and the walls of the mold cavity. Thus, various combinations of fingers permit several contact blade arrangements in the same mold without the necessity of rebuilding the mold for different types of switches. There is, accordingly, less down time for short run mold operations. The pivoted arrangement of the fingers and their removable pivot pins facilitate the changing of inserts (fingers) which can be arranged in sets for the different switches required. It is merely necessary to remove the pivot pins, then remove one set of fingers and replace it with another before replacing the pivot pin.

Contrasted with the present day "stack" switch, our molded type has additional advantages with respect to electrical safety. The side edges of the portions of the contact blades imbedded in the block 66 are protected from electrical contact with extraneous elements (such as conduit boxes and the like) adjacent the molded block. The block is also molded in such a way as to provide a lining of insulation in each mounting hole of each contact blade and accordingly there is no possibility of "shorting" from the blade to any mounting screws that pass through the holes 67 for installing the switch.

The use of the tabs 86 shown in FIG. 14 and the grooves 92 and 92*a* which cooperate therewith accurately locate the switch blades longitudinally and thereby center their mounting holes with respect to the mounting pins 72. Those tabs 86 which project upwardly may be accommodated by a cross groove 96 in the mold cover 16 as shown in FIG. 17. The staggered arrangement of the tabs 86 serves to identify contact and non-contact sides of the switch blades, and other characteristics thereof for proper assembly of the required blades for a particular type of switch stack.

Since the molded material, which may be anywhere from 300° to 350° F., enters the mold cavity 22, this is the hottest part of the mold structure and the fingers 34, 36 and 38 extend away therefrom and act as heat dissipaters so that the outer ends of the switch blades are not unduly heated to such an extent as to discolor the contacts and melt or soften the lifter posts 88. This is a desirable feature of the construction whether the lifter posts are snapped on, riveted on or molded on the switch blades. It is thus possible to assemble the lifter posts to the switch blades as in FIG. 14 before the switch blades are mounted in the mold, whereas if it were required to mount the lifter post after the assembly has been completed as in FIG. 11 considerable manufacturing difficulties would be encountered.

Some changes may be made in the construction and arrangements of the parts of our mold for mounting switch blades and the like without departing from the real spirit and purpose of our invention, and it is our intention to cover by our claims any modified forms of structure or use of mechanical equivalents which may reasonably be included within their scope.

We claim as our invention:

1. A mold for mounting a plurality of elements partially imbedded in a block of molded material comprising means forming a mold cavity with the exception of one wall thereof, pivoted fingers forming said one wall of said cavity when said pivoted fingers are in one position, said pivoted fingers having means to receive certain portions of said elements to be mounted and to position them relative to said mold cavity, and said fingers being capable of pivoting to another position and carrying with them said elements together with the block of molded material formed in said mold cavity.

2. A mold according to claim 1 wherein a removable pivot pin is provided for said pivoted fingers to permit interchanging of sets of fingers for different combinations of said elements.

3. A mold according to claim 1 wherein said means forming a mold cavity does so with the exception of second wall thereof, and other pivoted fingers are provided forming said second wall of said mold cavity, said other pivoted fingers having means to receive other portions of said elements to aid in accurately positioning them relative to said mold cavity.

4. A mold according to claim 1 wherein ejection means is provided to pivot said fingers to said another position thereby moving said assembly of elements and molded block to a position with respect to said mold from which the assembly may readily be removed.

5. A mold according to claim 1 wherein mounting hole pins are projected into said mold cavity and through mounting holes of said elements to form mounting holes in said molded block.

6. A mold according to claim 4 wherein said ejection means is movable to a position projecting into said mold cavity and engages said molded block to move it from its molded position.

7. A mold according to claim 5 wherein said mounting hole pins are smaller in diameter than said mounting holes of said elements to provide space between the mounting hole pins and the inner edges of said hole to receive molding material which serves as a lining for said holes.

8. A mold for partially imbedding a plurality of elements in a molded block of material comprising a mold proper and a mold cover providing a mold cavity with the exception of two opposite walls of said cavity, one set of pivoted fingers forming one of said opposite walls and a second set of pivoted fingers forming the other of said opposite walls of said mold cavity when said fingers are in one position, said fingers having means to receive certain portions of said elements to be mounted and to position them relative to said mold cavity, said fingers being capable of pivoting to other positions with one set of them carrying with them said elements together with the block of molded material formed in said mold cavity and partially imbedding said elements, and the other set of fingers completing the opening of said mold cavity to permit said first set of fingers to eject the resulting assembly of elements and block from said mold cavity.

9. A mold according to claim 8 wherein said mold proper has a pair of channel-shaped portions extending in opposite directions from said mold cavity, and said fingers are located in said channel-shaped portions of said mold proper.

10. A mold according to claim 9 wherein pivot pins are provided for said fingers and are removably mounted in said mold proper to permit interchanging of sets of fingers in said channel-shaped portions for different combinations of partially imbedded elements.

11. A mold according to claim 8 wherein ejection means is provided to pivot said fingers to said another position thereby positioning said elements and said molded block in a readily removable position with respect to said mold.

12. A mold according to claim 8 wherein mounting hole pins are projected into said mold cavity and through mounting holes of said elements to form mounting holes in said molded block.

13. A mold according to claim 12 wherein said mounting hole pins are smaller in diameter than said mounting holes of said elements to provide space in said holes surrounding said mounting hole pins to receive molding material which constitutes lining means for said holes.

14. A mold according to claim 8 wherein said elements are in the form of sheet metal strips of less width than said mold cavity whereby said molded block protects the side edges thereof from electrical contact with extraneous elements adjacent said molded block.

15. A mold according to claim 1 wherein said pivoted fingers are elongated, and are provided with recesses to receive tabs exending from said plurality of elements to accurately position them longitudinally of said fingers.

16. A mold according to claim 15 wherein mounting hole pins are projected into said mold cavity and through mounting holes of said elements to form mounting holes in said molded block, said tabs and recesses effecting accurate centering of said mounting holes in relation to said mounting hole pins.

17. A mold according to claim 16 wherein said mounting hole pins are smaller in diameter than said mounting holes of said elements to provide space between the mounting hole pins and the inner edges of said holes to receive molding material which serves as a lining for said holes which is of equal wall thickness throughout its diameter.

18. A mold according to claim 1 wherein said mold cavity is shaped to form said block of molded material with round corners.

19. A mold according to claim 1 wherein said fingers have tail portions extending from their pivots in a direction away from said mold cavity and are suitable for engagement by the finger of an operator for pivoting said fingers and thereby elevating the assembly of elements and molded block to a position with respect to said mold from which the assembly may readily be removed.

20. A mold according to claim 1 wherein said fingers and the elements carried thereby extend a substantial distance from said mold cavity to effect reduction of the temperature thereof by radiation with respect to the temperature of the mold surrounding said mold cavity.

References Cited

UNITED STATES PATENTS

| | | | |
|---|---|---|---|
| 2,120,502 | 6/1938 | Morton. | |
| 2,306,732 | 12/1942 | Huxam. | |
| 2,369,291 | 2/1945 | Frank et al. | 18—36 |
| 2,730,035 | 1/1965 | Hodge et al. | 18—36 |
| 3,234,756 | 2/1966 | Hanson | 18—36 XR |

J. HOWARD FLINT, Jr., Primary Examiner